United States Patent [19]

Stewart

[11] Patent Number: 5,250,343
[45] Date of Patent: Oct. 5, 1993

[54] PLASTICS MATERIAL

[75] Inventor: Gregory R. Stewart, Auckland, New Zealand

[73] Assignee: Transpak Industries Limited, Auckland, New Zealand

[21] Appl. No.: 881,863

[22] Filed: May 12, 1992

[30] Foreign Application Priority Data

May 15, 1991 [NZ] New Zealand .................. 238156
Sep. 13, 1991 [NZ] New Zealand .................. 239793

[51] Int. Cl.⁵ .................................................. B32B 27/08
[52] U.S. Cl. ................................. 428/141; 428/516; 428/520; 428/910; 264/154; 264/288.8; 264/290.2
[58] Field of Search ............... 428/516, 349, 520, 910, 428/141; 264/290.2, 154, 288.8

[56] References Cited

U.S. PATENT DOCUMENTS

| | | | |
|---|---|---|---|
| 4,578,316 | 3/1986 | Clauson ................ | 428/349 |
| 4,828,928 | 5/1989 | Shah ..................... | 428/349 |
| 4,855,187 | 8/1989 | Osgood et al. ........ | 428/500 |
| 4,863,770 | 9/1989 | Knox, III .............. | 428/516 |

FOREIGN PATENT DOCUMENTS 1161679  1/1964  Fed. Rep. of Germany .
WO89/10839  11/1989  PCT Int'l Appl. .

OTHER PUBLICATIONS

Copy of the English translation of DE 1 161 679.

Primary Examiner—Edith Buffalow
Attorney, Agent, or Firm—Merchant & Gould Smith, Edell, Welter & Schmidt

[57] ABSTRACT

A plastics material with at least first and second layers of plastic polymeric material, the material of the first layer having a melting point lower than the melting point of the material of the second layer. The layers are orientated and heated to at least the melting point of the first layer so that the first layer breaks up to form an irregular surface pattern bonded to the second layer. A method of producing the plastics material is also provided, the orientation and heating being done sequentially or simultaneously. The material has cloth-like properties with a "soft" feel and with minimal noise.

11 Claims, 7 Drawing Sheets

PLASTICS MATERIAL

BACKGROUND TO THE INVENTION

This invention relates to improvements in and relating to plastics materials and more particularly but not exclusively to plastics films having cloth-like properties or characteristics so as to be suitable for use in disposable diapers for example.

Such films preferably have a matt appearance i.e. have a low surface gloss and a low tensile modulus or stiffness and for simplicity are referred to hereinafter as "films of the type described".

Typically, such films will therefore have a very "soft" feel and without, or with minimal, noise or "crinkle" which is typical of most plastics films.

Various prior art films have sought to achieve such characteristics. In New Zealand Patent Specification No. 225905 for example a microbubbled polymeric web is achieved by the application of a liquid onto a web of polymeric film to deform it. The resultant pattern of microbubbled surface aberrations results in a substantial lack of any rustling noises.

Other prior art techniques have utilised embossing to provide a textile like pattern, such as in New Zealand patent specification No. 226036 or have utilised fillers, such as calcium carbonate, as in the U.S. Pat. No. 4,798,602.

These prior arts techniques all suffer from various disadvantages in respect of the degree to which the desired properties are achieved or the time or complexity in making such films.

When such films are used for products such as disposable diapers, it has been found that the adhesion of the diaper tapes can be inadequate.

Also, with the use of fillers or embossing it has been found that this tends to reduce the tensile strength of the film so as to require the use of a relatively thick film.

It is an object of the present invention in its various embodiments to provide a plastics material and/or a method of making same which will avoid or obviate disadvantages in the prior art films or methods of making same to the present time or which at least will provide the public with a useful alternative.

Further objects of the invention will become apparent from the following description.

BRIEF SUMMARY OF THE PRESENT INVENTION

According to one aspect of the present invention there is provided a plastics material comprising at least first and second layers of plastic polymeric materials which are bonded together wherein the melting point of the material of said first layer is lower than the melting point of the material of said second layer and said first layer is broken up to form an irregular surface pattern by the orientation and the heating of said layers to at least the lower melting point but below the higher melting point.

According to a further aspect of the present invention there is provided a method of making a plastics material having at least first and second layers of polymeric plastics materials characterised in, selecting the material of the said first layer to have a melting point which is lower than the melting point of the material of said second layer, orientating said layers and heating said layers to a temperature at least that of the melting point of the said first layer but below that of the said second layer, said orientating and heating being carried out sequentially or simultaneously, whereby said first layer breaks up to form an irregular surface pattern bonded to said second layer.

According to a still further aspect of the present invention there is provided a method of making a plastics material as defined in the paragraph immediately above characterised in that said layers are orientated at a temperature lower than the melting point of said first layer and said layers are then heated to a temperature at least that of the melting point of said first layer whereby said first layer breaks up to form an irregular surface pattern bonded to said second layer.

According to a still further aspect of the present invention there is provided a plastics material made by the method as defined in either of the two paragraphs immediately above.

According to a still further aspect of the present invention there is provided a sanitary product formed from a plastics material having cloth-like properties which, or the method of making which, is defined in the immediately preceding paragraphs.

Further aspects of this invention which should be considered in all its novel aspects will become apparent from the following description, which is given by way of example only of possible embodiments.

BRIEF DESCRIPTION OF THE DRAWINGS

Referring now to the accompanying illustrations wherein.

DETAILED DESCRIPTION OF THE PREFERRED EMBODIMENTS OF THE PRESENT INVENTION

The various embodiments of the invention described below include a multi-layer film having at least two layers but possibly 14 or more layers, the properties of the material of the respective layers being selected so that preferably after co-extrusion, the orientation and heating results in the desired film.

Taking the basic film consisting of a pair of layers, the first layer is required to have a melting point which is lower than the second layer. Typically the first layer would be selected from a polyolefin with a low melting point and a low melt index. Examples of polyolefins suitable for this purpose would be ethylene vinyl acetate co-polymers (EVA) and filled polyethylenes, low density polyethylene, ethylene butyl acrylate co-polymer and ethylene methacrylic acid co-polymer. Many other co-polymers or terpolymers of ethylene would also be suitable.

The second layer is required to have a higher melting point and suitably is selected from a polyolefin readily orientated close to the melting point of the first layer. Suitable polyolefins would be selected from the group of high density polyethylene, polypropylene, polybutylene, linear low density polyethlene or ultra low linear low density polyethylene (ULLLDPE).

One possible structure would be A/B/A where:
A=EVA
B=ULLLDPE

A further structure could be A/C/B/C/A where, A and B are as above described and:
C=Modified polyethylene.

One or more of the layers may incorporate additional materials such as MASTERBATCH (T.M.), anti-block, anti-slip or colouring. Also, a water absorbent material may be incorporated in one or more layers with advantage in sanitary products such as diapers, incontinence pants, sanitary napkins, and the like.

In producing the film according to a preferred embodiment of the invention, the multiple layer film is suitably co-extruded and may then be orientated, which could be monoaxially or biaxially, at a temperature approximating that of the melting point of the first layer i.e. the lower melting point. The orientating ratio may be at least 2 times and possibley as high as 7 times but 3 to 5 times may be preferable.

It has been found that the resultant film has the required cloth-like properties and may have a thickness between 8 μm–200 μm. FIGS. 1 to 5 and 7 to 10 show examples of films which have been made by the present invention. When magnified, the first outer layer is shown to have an irregular, broken up, surface created over at least the second layer resulting in a film with cloth-like properties, a matt appearance and low or minimal noise. The broken up first layer is seen to form a cratered appearance of flattened peaks and pits or troughs. This surface in conjunction with the materials used for the layers results in the film with the required characteristics. The "cratering" has been found to be beneficial in facilitating the gripping of tape, for example, to it.

Figure 4:
FIG. 4 Shows a plastics film according to Example 2 according to a further embodiment of the invention and magnified by 150 times.
Figure 5:
FIG. 5 Shows Example 2 of the preceding figure magnified by 1,000 times.
Figure 6:
FIG. 6 Shows the film of Example 2 magnified by 1000 times but before its orientation.
Figure 7:
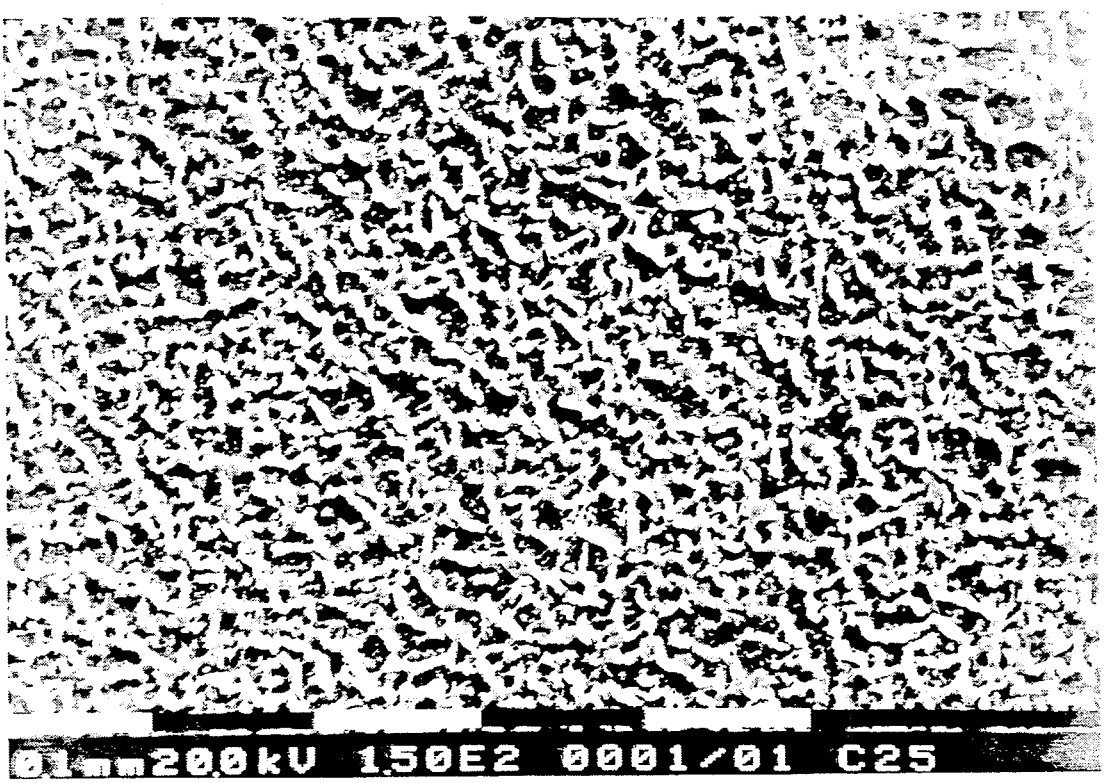
FIG. 7 Shows Example 3A according to a further embodiment of the invention magnified by 150 times.
Figure 8:
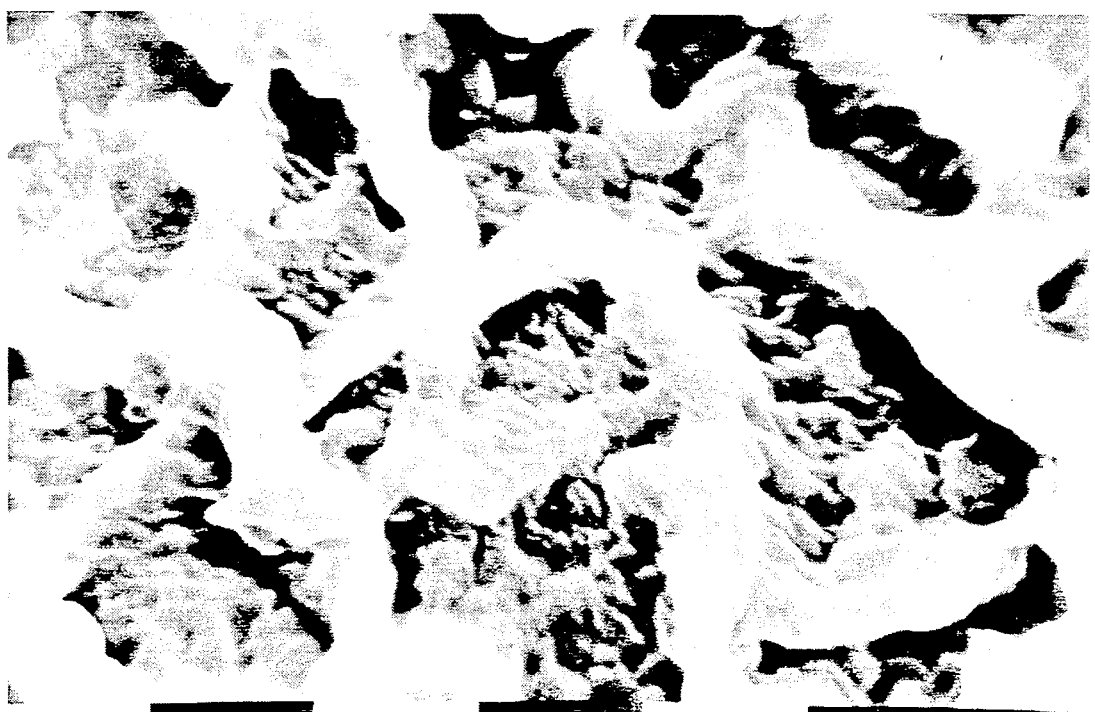
FIG. 8 Shows Example 3A of the preceding figure magnified 1500 times.
Figure 9:
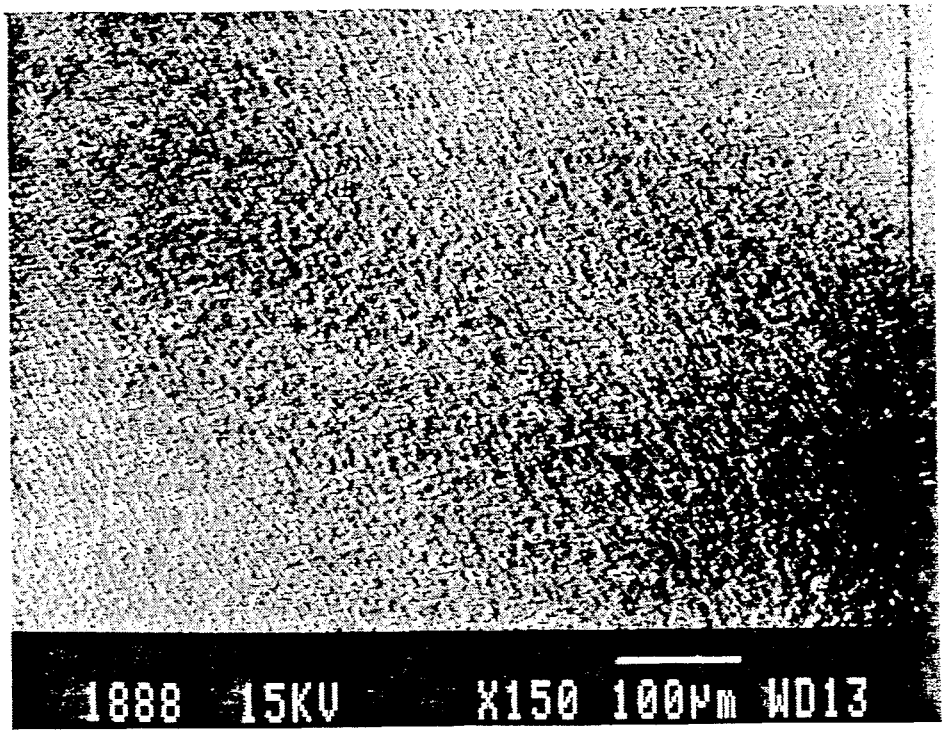
FIG. 9 Shows Example 3B according to a further embodiment of the invention magnified by 150 times.
Figure 10:
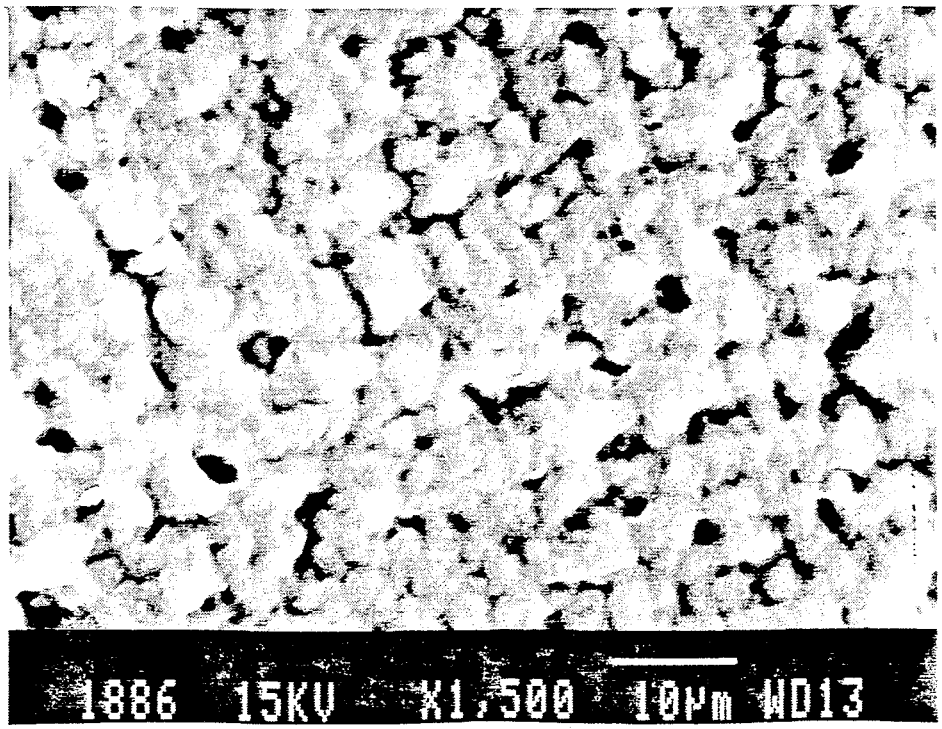
FIG. 10 Shows Example 3B of the preceding figure magnified 1500 times.
Figure 11:
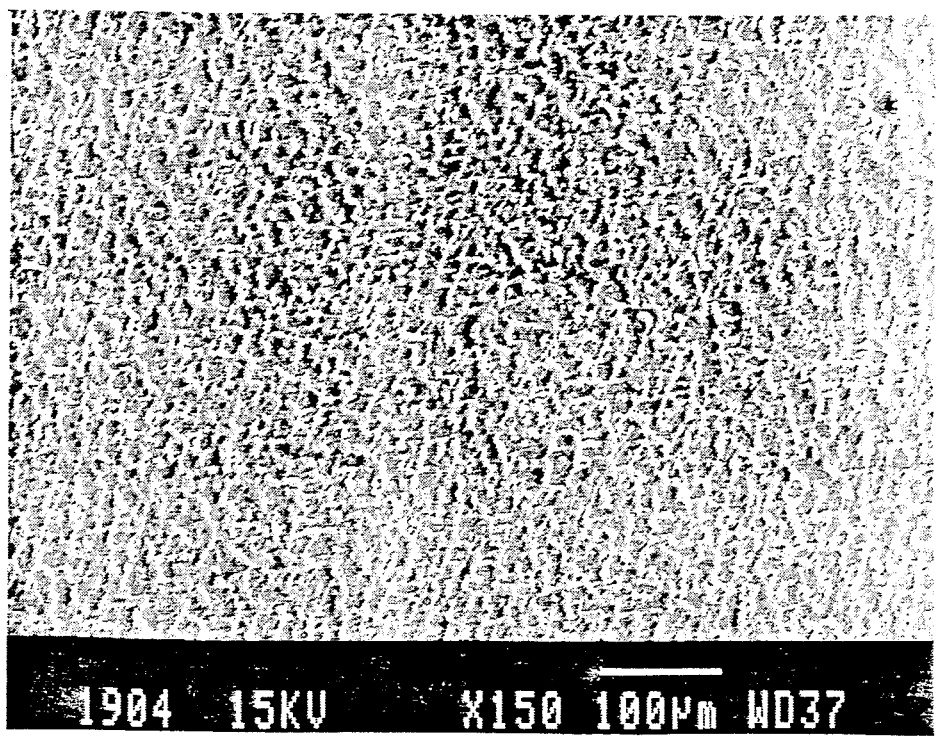
FIGS. 11 AND 12 Shows Example 4 magnified by 150 and 1500 times respectively.
Figure 12:
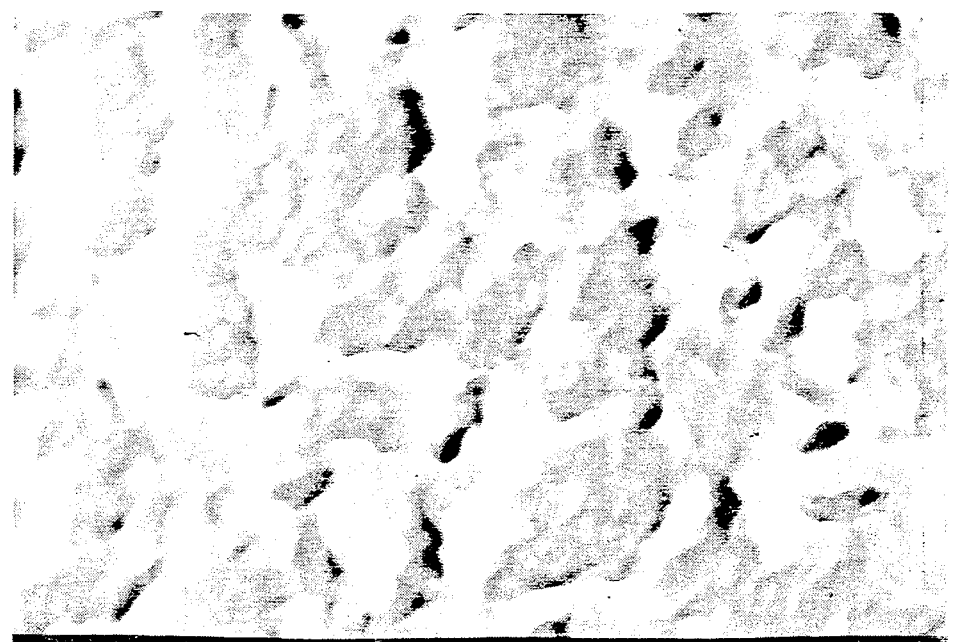
Figure 13:
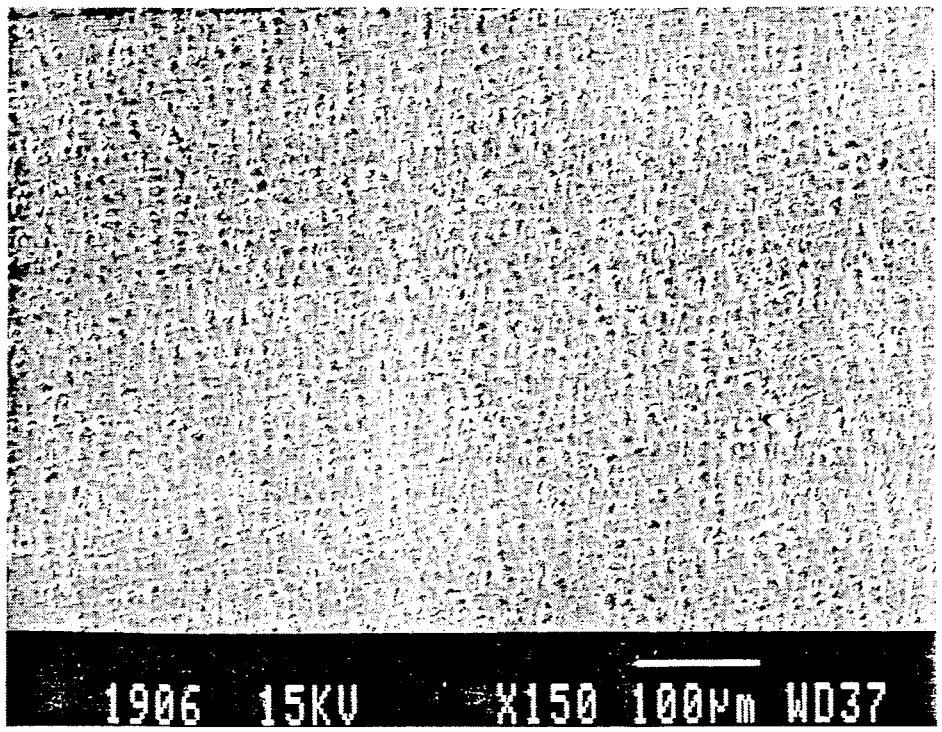
FIGS. 13 AND 14 Show Example 5 magnified by 150 and 1500 times respectively.
Figure 14:
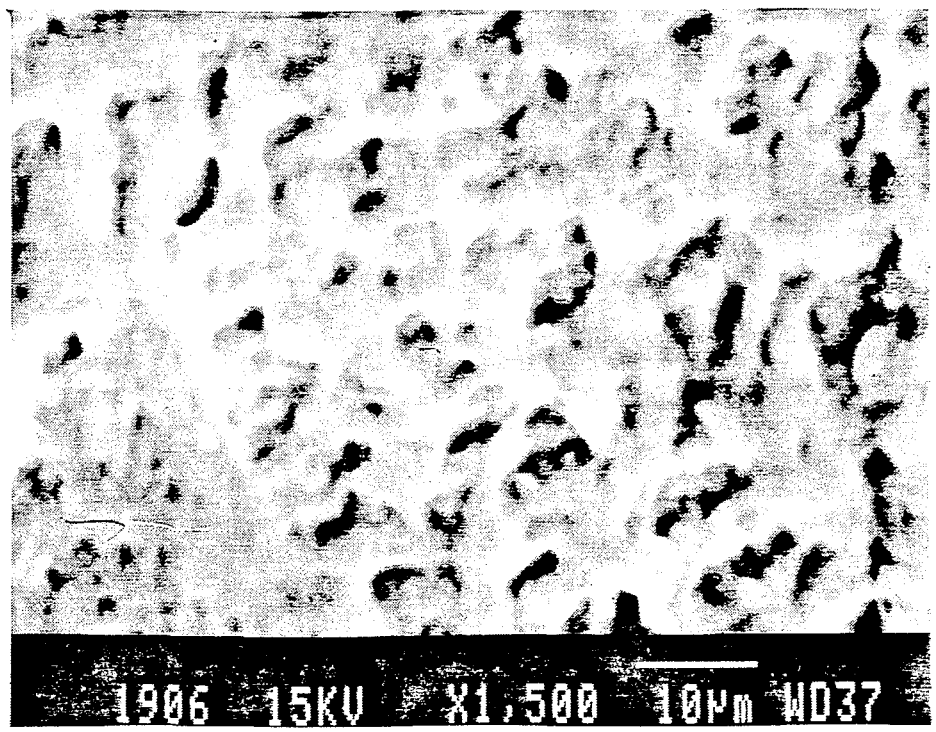

FIG. 6 shows the surface of the film of FIGS. 4 and 5 before orientation.

In the description hereinafter the term "blocking" or "blocked" refers to the known technique of fusing two or more layers of material to form a single layer.

EXAMPLE 1

A five layer film structure was produced by blocking a three layer co-extrusion produced on a 150 mm φ blown film die. The inside and outside layers are each fed by a single screw 45 mm φ extruder and the middle layer is fed by a single screw 30 mm φ extruder.

FINAL FILM STRUCTURE

Final film Structure is as follows:

| Layer | | |
|---|---|---|
| 1 (13.5 μm) | EVA | |
| 2 (15.7 μm) | Polybutylene | |
| 3 (13.5 μm) | EVA | |
| 4 (13.5 μm) | EVA | |
| 5 (15.7 μm) | Polybutylene | |
| 6 (13.5 μm) | EVA | |

(Layers No. 3 and 4 are blocked to provide a five layer structure).

Each extruder feeds the die with 6.7 kg/hr of melt, giving a total output of 20.1 kg/hr.

The bubble is drawn off by the nips at 8.8 m/min

The EVA used in this particular example was Du Pont Elvax (R) 3135 as extrudable ethylene vinyl acetate copolymer resin having a melt temperature of 92° C.

Melt Index=0.25 g/10 min
Density=0.94 g/cc
Copolymer %=12%

The polybutylene used was Mitsui (R) M3110 having a melt temperature of 112° C.

The extruded blocked tube was then monoaxially orientated by passing through a preheating roller 1, then through a series of nine equally sized rollers each stationed vertically above the next, followed by a cooling roller 11. The speed and temperature of each roller is controllable to allow orientation at precise temperature.

An orientated film was produced using the following conditions:

| Roller No. | Speed m/min | Temperature (°C.) |
|---|---|---|
| 1 | 1.1 | 70 |
| 2 | 1.1 | 90 |
| 3 | 1.1 | 90 |
| 4 | 1.5 | 95 |
| 5 | 1.5 | 95 |
| 6 | 3.0 | 100 |
| 7 | 3.1 | 100 |
| 8 | 3.1 | 100 |
| 9 | 3.1 | 100 |
| 10 | 3.0 | 100 |
| 11 | 3.0 | 25 |

The film produced was then analysed (refer Laboratory Report)

| LABORATORY REPORT Example 1. | | |
|---|---|---|
| | Before Orientation | After Orientation |
| Gauge: (NZS 7651:1976) | 86 μm | 35 82 m |
| Yield: | 78.2 g/m² | 21.1 g/m² |
| Tensiles: (ASTM D882) | | |
| UTS: | | |
| MD | 61 N/25 mm | 31 N/25 mm |
| TD | 60 N/25 mm | 18 N/25 mm |
| ELONGATION: | | |
| MD | 281% | 25% |
| TD | 401% | 337% |
| Tear Resistance: (ASTM D1922) | | |
| MD | 571 gF | 220 gF |
| TD | 800 gF | 120 gF |

Figure 1:
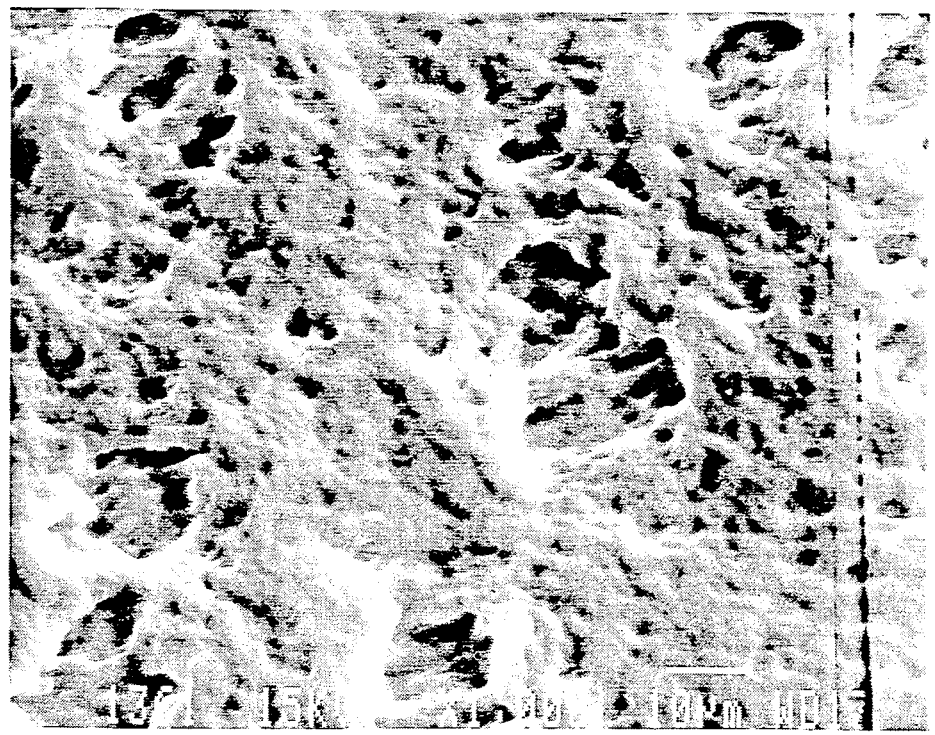
FIG. 1 Shows a plastics film according to example 1 of one possible embodiment of the invention and magnified one thousand times.
Figure 2:
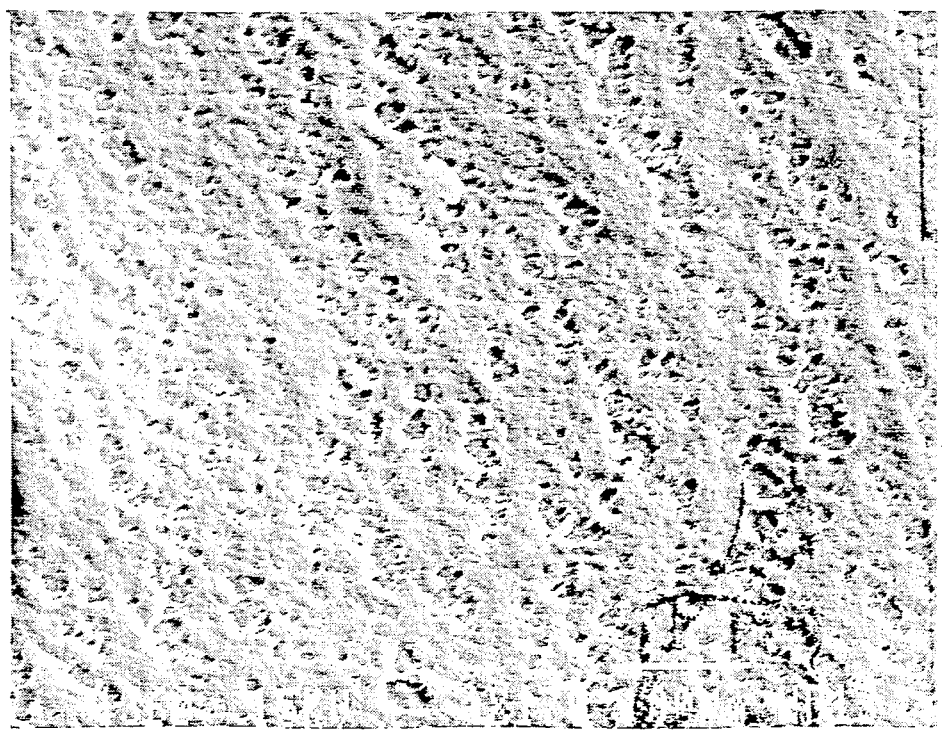
FIG. 2 Shows the plastics film of example 1 magnified one hundred and seventy times.
Figure 3:
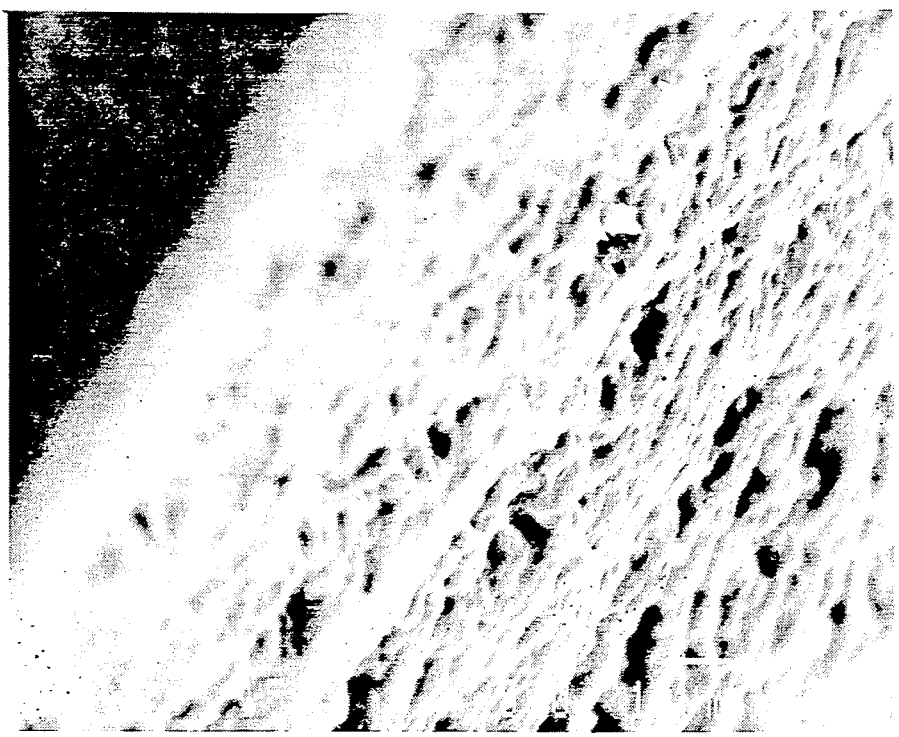
FIG. 3 Shows Example 1 of the preceding figures magnified by 850 times with the view on an angle on the side near the edge of the film.

FIGS. 1 to 3 show actual photographs of the film of Example 1. The EVA providing the outer layers is seen to have broken up to provide an irregular surface pattern over the polybutylene. The film is soft and cloth-like with no noticeable "crinkle".

EXAMPLE 2

Referring now to FIGS. 4 and 5 of the accompanying drawings, example 2 according to a further embodiment of the invention, which is described in greater detail below, is shown again provided with an irregular pattern creating the desired cloth-like properties. FIG. 6 shows the surface of the film before orientation.

A five layer blocked co-extrusion was produced as in Example No. 1.

The Mitsui Polybutylene was replaced with an Ultra Low Linear Low Density Polyethylene (ULLLDPE). Dow Attane (T.M.) 4003 was used having a melting point of 122° C.

Melt Index = 0.8 g/10 min
Density = 0.905 g/cc

FINAL FILM STRUCTURE

Final film structure is as follows:

| Layer | | |
|---|---|---|
| 1 | 13.5 μm | EVA |
| 2 | 14.0 μm | ULLLDPE |
| 3 | 13.5 μm | EVA |
| 4 | 13.5 μm | EVA |
| 5 | 14.0 μm | ULLLDPE |
| 6 | 13.5 μm | EVA |

(Layers 3 and 4 are blocked to produce a five layer structure.)

Each extruder feeds the die with 4.3 kg/hr of melt giving a total die output of 12.9 kg/hr.

The bubble is drawn off by the nips at 5.7 m/min.

The film is monoaxially orientated using the same equipment as Example No. 1 but the following running conditions were used:

| Roller No. | Speed m/min | Temperature (°C.) |
|---|---|---|
| 1 | 1.1 | 75 |
| 2 | 1.2 | 87 |
| 3 | 1.2 | 87 |
| 4 | 1.6 | 95 |
| 5 | 1.7 | 95 |
| 6 | 5.1 | 100 |
| 7 | 5.1 | 100 |
| 8 | 5.1 | 100 |
| 9 | 5.1 | 100 |
| 10 | 5.2 | 100 |
| 11 | 5.2 | 25 |

| LABORATORY REPORT Example 2 | | |
|---|---|---|
| | Before Orientation | After Orientation |
| Gauge: (NZS 7651:1976) | | |
| Average: | 82 μm | 22 μm |
| Yield: | 73.2 g/m² | 16.4 g/m² |
| Tensiles: (ASTM D882) | | |
| UTS: | | |
| MD | 44 N/25 mm | 31 N/25 mm |
| TD | 53 N/25 mm | 7 N/25 mm |
| ELONGATION: | | |
| MD | 281% | 24% |
| TD | 401% | 337% |
| Tear Resistance: (ASTM D1922) | | |
| MD | 650 gF | 349 gF |
| TD | 1101 gF | 168 gF |

EXAMPLE 3A

Referring now to FIGS. 7, 8, 9, and 10 of the accompanying drawings, examples 3A and 3B according to a further embodiment of the invention, which is described in greater detail below, are shown again provided with an irregular pattern creating the desired cloth-like properties.

Effectively a 3-layer film structure was produced by blocking a 5-layer co-extrusion produced on a 300 mm φ blown film die. The outside, middle and inside layers are each fed by a single screw 60 mm φ extruder and the bond layer is fed by a single screw 45 mm φ extruder.

The Dow Attane TM 4003 was replaced with a Dow Attane TM 4001. This has a melting point of 122° C.

Melt Index = 1.0 g/10 min
Density = 0.912 g/cc

FINAL FILM STRUCTURE

Final Film structure as follows:

| Layer | | |
|---|---|---|
| 1 | 5.7 μm | EVA |
| 2 | 1.9 μm | ULLLDPE |
| 3 | 16.2 μm | ULLLDPE |
| 4 | 1.9 μm | ULLLDPE |
| 5 | 12.4 μm | ULLLDPE |
| 6 | 12.4 μm | ULLLDPE |
| 7 | 1.9 μm | ULLLDPE |
| 8 | 16.2 μm | ULLLDPE |
| 9 | 1.9 μm | ULLLDPE |
| 10 | 5.7 μm | EVA |

(Layers 2 to 8 are blocked to provide a three layer structure).

Extruders 1, 2, 3 and 4 feed the die with 20.2, 32.7, 10.7 and 6.8 kg/hr of melt respectively, giving a total output of 70.4 kg/hr.

The bubble is drawn off by the nips at 26.8 m/min.

The film is monoaxially orientated using the same equipment as Example No. 1 but the following running conditions were used.

| Roller No. | Speed (m/min) | Temperature (°C.) |
|---|---|---|
| 1 | 2.6 | 55 |
| 2 | 2.7 | 65 |
| 3 | 2.7 | 65 |
| 4 | 2.7 | 80 |
| 5 | 2.7 | 80 |
| 6 | 3.8 | 108 |
| 7 | 10.4 | 108 |
| 8 | 10.4 | 108 |
| 9 | 10.3 | 108 |
| 10 | 10.4 | 108 |
| 11 | 10.4 | 25 |

| LABORATORY REPORT Example 3A | |
|---|---|
| | After Orientation |
| Gauge: (NZS 7651:1976) | 19 μm |
| Yield: | 18.2 g/m² |
| Tensiles: (ASTM D882) | |
| UTS: | |
| MD | 52.4 N/25 mm |
| TD | 8.6 N/25 mm |
| ELONGATION: | |
| MD | 65% |
| TD | 540% |
| Tear Resistance: (ASTM D1922) | |
| MD | 543 gF |

-continued

LABORATORY REPORT
Example 3A

| | After Orientation |
|---|---|
| TD | 370 gF |

EXAMPLE 3B

The final structure of this film is identical to that of Example 3A.

The film is monoaxially orientated using the same equipment as Example No. 1 but the following running conditions were used:

| Roller No. | Speed (m/min) | Temperature (°C.) |
|---|---|---|
| 1 | 2.6 | 55 |
| 2 | 2.7 | 65 |
| 3 | 2.7 | 65 |
| 4 | 3.6 | 80 |
| 5 | 10.4 | 80 |
| 6 | 10.4 | 108 |
| 7 | 10.4 | 108 |
| 8 | 10.3 | 108 |
| 9 | 10.4 | 108 |
| 10 | 10.4 | 108 |
| 11 | 10.4 | 25 |

It is seen that in contrast to Example 3A, the orientating and the heating is effected sequentially, the orientating being commenced at a low temperature of 80° C. and the material is then heated up to the EVA melt temperature. This "cold draw" technique creates a changed surface pattern of the EVA in the final film from that of the "hot draw" technique of Example 3A. It is a less regular surface pattern and is not as desirable, because it can produce a "patchy" appearance. Also cold drawing is less energy efficient as hot drawing is able to make use of the energy released as heat during drawing.

EXAMPLE 4

A seven layer film structure was produced by blocking two 5 layer films co-extruded on a 300 mm φ blown film die. The outside, middle and inside layers are each fed by a single screw 60 mm φ extruder and the bond layer is fed by a single screw 45 mm φ extruder.

A butene linear low density polyethylene ESCORENE LL1001XF was introduced into the middle layer. This has a melting point of 121.5° C.

| Melt Index | 1.0 g/10 min |
|---|---|
| Density | .918 g/cc |

FINAL FILM STRUCTURE

| Layer 1 | 5.7 μm | EVA |
|---|---|---|
| 2 | 1.9 μm | ULLLDPE |
| 3 | 22.8 μm | Butene LLDPE |
| 4 | 1.9 μm | ULLLDPE |
| 5 | 5.7 μm | ULLLDPE |
| 6 | 5.7 μm | ULLLDPE |
| 7 | 1.9 μm | ULLLDPE |
| 8 | 22.8 μm | Butene LLDPE |
| 9 | 1.9 μm | ULLLDPE |
| 10 | 5.7 μm | EVA |

The blocking of the two co-extruded 5 layer films produces a 7 layer structure.

Extruders 1, 2, 3 and 4 feed the die with 9.1, 43.5, 8.2 and 10.1 Kg/hr of melt respectively, giving a total output of 68 Kg/hr.

The bubble is drawn off by the nips at 13.3 m/min.

The film is monoaxially orientated using the same equipment as Example No 1 but the following running conditions were used.

| Roller No. | Speed (m/min) | Temperature (°C.) |
|---|---|---|
| 1 | 2.0 | 65 |
| 2 | 2.1 | 75 |
| 3 | 2.1 | 75 |
| 4 | 2.2 | 85 |
| 5 | 2.3 | 85 |
| 6 | 8.0 | 108 |
| 7 | 8.1 | 108 |
| 8 | 8.1 | 108 |
| 9 | 8.1 | 108 |
| 10 | 8.1 | 108 |
| 11 | 8.1 | 25 |

LABORATORY REPORT
Example 4

| | After Orientation |
|---|---|
| Gauge: (NZS 7651:1976) | 19 μm |
| Yield: | 18.3 g/m² |
| Tensiles: (ASTM D882) | |
| UTS: | |
| MD | 48.7 N/25 mm |
| TD | 8.0 N/25 mm |
| ELONGATION: | |
| MD | 71% |
| TD | 516% |
| Tear Resistance: (ASTMD1922) | |
| MD | 224 gF |
| TD | 257 gF |

EXAMPLE 5

A five layer film structure was produced by co-extrusion on the same 300 mm φ blown film die as that described in Example No 4.

FINAL FILM STRUCTURE

| Layer 1 | 11.4 μm | EVA |
|---|---|---|
| 2 | 3.8 μm | ULLLDPE |
| 3 | 28.5 μm | Butene LLDPE |
| 4 | 3.8 μm | ULLLDPE |
| 5 | 28.5 μm | Butene LLDPE |

Extruders 1, 2, 3 and 4 feed the die with 9.9, 24.3, 24.3 and 6.4 kg/hr of melt respectively, giving a total output of 64.9 kg/hr.

The bubble is drawn off by the nips at 6.8 m/min.

The film is monoaxially orientated using the same equipment as Example No 4 but the following running conditions were used:

| Roller No. | Speed (m/min) | Temperature (°C.) |
|---|---|---|
| 1 | 2.0 | 65 |
| 2 | 2.1 | 75 |
| 3 | 2.1 | 75 |
| 4 | 2.2 | 85 |
| 5 | 2.3 | 85 |

-continued

| Roller No. | Speed (m/min) | Temperature (°C.) |
| --- | --- | --- |
| 6 | 8.0 | 108 |
| 7 | 8.1 | 108 |
| 8 | 8.1 | 108 |
| 9 | 8.1 | 108 |
| 10 | 8.1 | 108 |
| 11 | 8.1 | 25 |

LABORATORY REPORT
Example 5

| | After Orientation |
| --- | --- |
| Gauge: (NZS 7651:1976) | 19 μm |
| Yield: | 18.0 g/m² |
| Tensiles: (ASTM D882) | |
| UTS: | |
| MD | 39.9 N/25 mm |
| TD | 7.7 N/25 mm |
| ELONGATION: | |
| MD | 89% |
| TD | 488% |
| Tear Resistance: (ASTMD1922) | |
| MD | 81 gF |
| TD | 488 gF |

In Example 3A, a three layer material is described with EVA providing the two outer layers.

It is to be appreciated that only a two layer material may be used so that in Example 3A, EVA could be provided on one side only by way of example. Such a structure may be particularly useful where the quality of appearance of the other layer is not important or is of lesser importance.

The above examples can be treated using well known techniques such as corona discharge.

It is thus seen that by orientation of selected materials and the simultaneous or sequential heating to selected temperatures, a multi-layer plastic material having the desired properties can be achieved making it suitable for use in diapers and other sanitary products.

It has been found however that the broken surface of the material is also very receptive to being written on. The present invention would therefore also be suitable for use for a label, tag, packaging or the like by courier, postal services or any other users requiring a surface to receive writing, printing or the like.

Depending on the intended use of the plastics material, its softness and strength may be of particular importance.

In carrying out the above examples, it has been found that a perceived increased softness may be obtained in an ABA structure, where A is 7.5% by weight EVA and B is 85% by weight of ULLDPE, as compared to an ABA structure, where A and B are again respectively EVA and ULLDPE but the percentages by weight are 33%/33%/33%.

Also the overall characteristics of the material have been found to be improved with a higher orientation temperature of 108° C. rather than 100° C.

Also it has been found that drawing at 4× rather than 5× can induce less stiffness into the film and accordingly a softer feel. Generally, the greater the draw, the stiffer and less soft the film becomes. The material could be drawn at 3.5× or even lower.

Accordingly it is necessary to be selective in respect of the materials used, the amount of draw and the temperatures used in achieving a material having the desired characteristics.

In the above examples 3A, 3B, 4 and 5, the values of "Tape Adhesion" for the treated material were as follows:

| Example | Tape Adhesion (g) |
| --- | --- |
| 3A & 3B | 690 |
| 4 | >1500 |
| 5 | 1010 |

Typical tape adhesion values in existing treated films would be considerably lower perhaps of the order of 300 g. The present invention is therefore seen to provide a substantial advantage in respect of tape adhesion.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope of the invention as defined in the appended claims.

I claim:

1. A method of making a plastics material having at least first and second layers of plastics polymeric materials bonded together wherein the material of said first layer is selected to have a melting point which is lower than the melting point of the material of said second layer, orientating said layers and heating said layers to a temperature at least that of the melting point of the said first layer but below that of said second layer, said orientating an heating being carried out sequentially or simultaneously, whereby said first layer breaks up to form an irregular surface pattern.

2. A method of making a plastics material as claimed in claim 1, comprising orientating the said layers at a temperature lower than the melting point of said first layer and then heating said layers to a temperature at least that of the melting point of said first layer.

3. A method of making a plastics material as claimed in claim 1 comprising orientating and heating the said layers simultaneously.

4. A method of making a plastics material as claimed in claim 1 comprising a structure AB, ABA, ABABA, ABCBC or ABCBCB where A is said first layer and consists of a co-polymer or terpolymer of ethylene and where B and C, when used, is a polyolefin, polyamide, polybutylene or polyvinyl alcohol.

5. A plastics material prepared according to the method of claim 1.

6. A plastics material comprising at least first and second layers of plastics polymeric materials which are bonded together, wherein the melting point of the material of said first layer is lower than the melting point of the material of said second layer and said first layer is broken up to form an irregular surface pattern by the orientation and the heating of said layers to at least the lower melting point but below the higher melting point.

7. A plastics material as claimed in claim 6 and having five layers ABABA wherein layers A are of ethylene vinyl acetate co-polymer and layers B are any one of polybutylene, polypropylene, high density polyethylene, linear low density polyethylene or ultra low linear low density polyethylene.

8. A plastics material as claimed in claim 6 having a structure AB or ABA wherein layer(s) A is/are of ethylene vinyl acetate co-polymer and layer B is of an ultra low linear low density polyethylene.

9. A plastics material as claimed in claim 6 having a structure ABCBC or ABCBCBA wherein layers A are of polyethylene vinyl acetate co-polymer, layers B are of an ultra low linear low density polyethylene and layers C are of a modified polyethylene.

10. A plastics material as claimed in claim 9 wherein layers C are of butene linear low density polyethylene.

11. A plastics material comprising at least first and second layers of plastics polymeric materials which are bonded together, wherein the melting point of the material of said first layer is lower than the melting point of the material of said second layer and said first layer is broken up to form an irregular surface pattern by the orientation and the heating of said layers to at least the lower melting point but below the higher melting point, said orientating and heating being carried out sequentially or simultaneously.

* * * * *

UNITED STATES PATENT AND TRADEMARK OFFICE
CERTIFICATE OF CORRECTION

PATENT NO. : 5,250,343
DATED : 5 October 1993
INVENTOR(S) : Stewart

It is certified that error appears in the above-identified patent and that said Letters Patent is hereby corrected as shown below:

In column 2, line 55, delete "Shows" and insert --Show--.

In column 4, line 51, delete "35 82m" and insert --35 µm--.

In column 5, line 13, delete "(T.M.)" and insert --(TM)--.

In column 6, line 14, delete "TM" and insert --(TM)--.

In column 6, line 15, delete "TM" and insert --(TM)--.

In column 10, line 49, delete "ABCBCB" and insert --ABCBCBA--.

Signed and Sealed this

Sixth Day of June, 1995

*Attest:*

BRUCE LEHMAN

*Attesting Officer*   *Commissioner of Patents and Trademarks*